United States Patent [19]
Tsao

[11] Patent Number: 6,016,171
[45] Date of Patent: Jan. 18, 2000

[54] HEIGHT-ADJUSTABLE CASE STRUCTURE FOR THE DISPLAY OF PORTABLE COMPUTERS

[75] Inventor: Lu-Lung Tsao, Taipei, Taiwan

[73] Assignee: Inventec Corporation, Taipei, Taiwan

[21] Appl. No.: 09/049,755

[22] Filed: Mar. 27, 1998

[51] Int. Cl.⁷ .................................................. H04B 5/64
[52] U.S. Cl. ...................... 348/836; 361/681; 312/208.4; 312/7.2; 312/223.2
[58] Field of Search ................................ 312/7.2, 208.4, 312/223.2; 348/836; 361/681, 682, 683, 395

[56] References Cited

U.S. PATENT DOCUMENTS

| | | | |
|---|---|---|---|
| 4,742,478 | 5/1988 | Nigro, Jr. et al. | 361/394 |
| 4,832,419 | 5/1989 | Mitchell et al. | 312/7.2 |
| 4,859,092 | 8/1989 | Makita | 312/237 |
| 4,901,261 | 2/1990 | Fuhs | 361/681 |
| 5,229,920 | 7/1993 | Spaniol et al. | 361/681 |

FOREIGN PATENT DOCUMENTS 3235457  3/1984  Germany ................................ 361/681

*Primary Examiner*—Peter M. Cuomo
*Assistant Examiner*—Gerald A. Anderson
*Attorney, Agent, or Firm*—Mikio Ishimaru

[57] ABSTRACT

A height-adjustable case structure is provided for the display of a portable computer, such as a notebook computer, which allows the user to adjust the display of the portable computer to a suitable height for comfortable viewing. The height-adjustable case structure includes a first case for housing a keyboard and a main circuit board for the portable computer; a second case for housing a display for the portable computer; means for hinging the second case on the first case; at least one guide bar on which the second case is slidably mounted, allowing the second case to be slidable along the guide bar to an elevated position; and an actuating mechanism mounted on the guide bar for securing the second case at a user-desired position on the guide bar. With this height-adjustable case structure, the user can adjust the second case, which houses the display, to a desired height that allows comfortable viewing of the display.

4 Claims, 5 Drawing Sheets

HEIGHT-ADJUSTABLE CASE STRUCTURE FOR THE DISPLAY OF PORTABLE COMPUTERS

BACKGROUND OF THE INVENTION

1. Field of the Invention

This invention relates to case structures for portable computers, and more particularly, to a height-adjustable case structure for the display of a portable computer, such as a notebook computer, which allows the user to adjust the display of the portable computer to a suitable height for comfortable viewing.

2. Description of Related Art

Conventional portable computers, such as notebook computers, typically include two cases: a first case for housing the keyboard and the main circuit board, and a second case for housing the display. A hinge device is used to link the second case to the first case, allowing the second case housing the display to be tilted to a suitable angle for viewing.

Notebook computers are very popular on the computer market due to light weight and compact size that allow the notebook computers to be highly portable. Although notebook computers have such benefits, they nonetheless have some drawbacks as compared to the desktop computers. For instance, the display of the notebook computer is relatively low in position that requires the user to eye down on the display when the notebook computer is placed on a desk for use, which may cause stress to the neck of the user. One solution to this problem is to place the notebook computer on something that is elevated from the desktop so as to level the display to he eyes of the user. This solution, however, causes another problem that when the notebook computer is elevated, the hands of the user should also be elevated from the desktop surface so as to be able to touch the keyboard. This can then cause stress to the hands of the user. Therefore, the conventional case structure for the notebook computer would not allow the user to operate the notebook computer in a comfortable manner.

SUMMARY OF THE INVENTION

It is therefore an objective of the present invention to provide a height-adjustable case structure for the notebook computer which allows the user to elevate the display of the notebook computer without having to elevate the keyboard of the same, so that the user can always adjust the display to a desired height for comfortable viewing.

In accordance with the foregoing and other objectives of the present invention, a height-adjustable case structure for the notebook computer is provided. The height-adjustable case structure of the invention includes:

- a first case for housing a keyboard and a main circuit board for the portable computer;
- a second case for housing a display for the portable computer;
- means for hinging the second case on the first case;
- at least one guide bar on which the second case is slidably mounted, allowing the second case to be slidable along the guide bar to an elevated position; and
- an actuating mechanism mounted on the second case for securing the second case at a user-desired position on the guide bar.

The guide bar is formed with a series of substantially equal spaced slots. The actuating piece of the actuating mechanism can be set in any one of the slots so as to secure the second case firmly in position on the guide bar. The slots can be instead toothed protrusions.

The actuating mechanism has various embodiments.

In the first embodiment, the actuating mechanism comprises a pivotal member which is pivotally mounted on the second case, and an elastic member affixed to one end of the pivotal member. Further, the pivotal member comprises a pressing portion which is pivotably mounted on the second case by means of a shaft and an actuating portion which is linked to the pressing portion; and the elastic member is mounted between the outer wall of the second case and the upper end of the pressing portion in such a manner as to outwardly urge against the upper end of the pressing portion, thus causing the actuating portion to be maintained in position in the slot so as to allow the second case to be stopped by the guide bar from being movable upwards or downwards along the guide bar. When the pressing portion of the pivotal member is pressed down, the pivotal member will be pivoted about the shaft, causing the elastic member to be compressed and the actuating portion to be withdrawn from the slot in the guide bar, allowing the second case to be movable along the guide bar to a desired position.

In the Second embodiment, the actuating mechanism comprises a toothed knob which is axially coupled to a shaft mounted in a receptacle of the second case and with teeth on the circumference thereof, and a stopping elastic member mounted on the wall of the second case. The stopping elastic member can be used to stop the rotation of the toothed knob. The teeth of the toothed knob are meshed to the slot in the guide bar such that, when subjected to no external force, the toothed knob which is meshed with the teeth thereof to the slot of the guide bar prevents the second case from being movable along the guide bar upwards or downwards. To adjust the second case to a desired height, the user needs just to manually rotate the toothed knob, allowing the second case to be moved along the guide bar until the second case reaches the desired height.

In the third embodiment, the actuating mechanism comprises an actuating piece which is positioned in a receptacle formed in the second case and perpendicular linked to the guide bar, and a restoring spring, such as a spiral spring, which is sleeved on the actuating piece and positioned between the inner wall and outer wall of the second case. The actuation piece is formed with a stopper portion on the inner end thereof, and a protruded portion extending along the length of the actuating piece and inset in the slot in the guide bar. The outer end of the actuating piece is extended to the outside of the receptacle to allow the user to pull the actuating piece in the outward direction. The restoring spring has an outer end affixed to the outer wall of the second case and an inner end affixed to the stopper portion of the actuating piece. When subjected to no external force, the restoring spring urges against stopper portion of the actuating piece and thus maintains the protruded portion of the actuating piece in position in the slot of the guide bar, thus preventing the second case from being movable along the guide bar upwards or downwards; and when the user pulls the actuating piece in the outward direction, the actuating piece is moved outwards, allowing the stopper portion to urge against and thus compress the restoring spring, and meanwhile allowing the protruded portion to withdraw from the slot in the guide bar, allowing the second case to be moved upwards or downwards along the guide bar to a desired height; and subsequently when the actuating piece is released, the restoring spring urging against the stopper portion of the actuating piece, thereby causing the actuating piece to be moved inwards until the protruded portion is set into the slot and the stopper portion is stopped by the inner wall of the second case, allowing the actuating piece to be restored to the position where the second case is prevented from being movable along the guide bar.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In the following detailed description, the preferred embodiments of the invention are utilized on a notebook computer. But it should be understood that the invention can be utilized on any types of portable computers.

Figure 1:
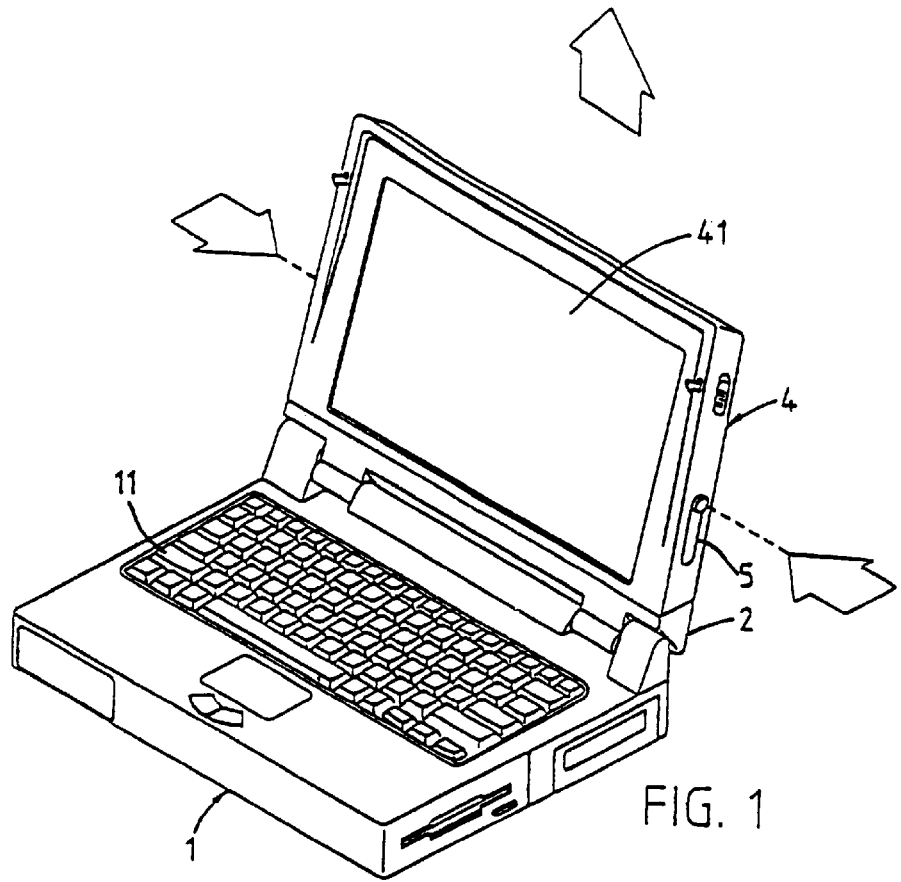
FIG. 1 is a schematic perspective view of a notebook computer which is provided with the first preferred embodiment of the height-adjustable case structure according to the invention.
Figure 6:
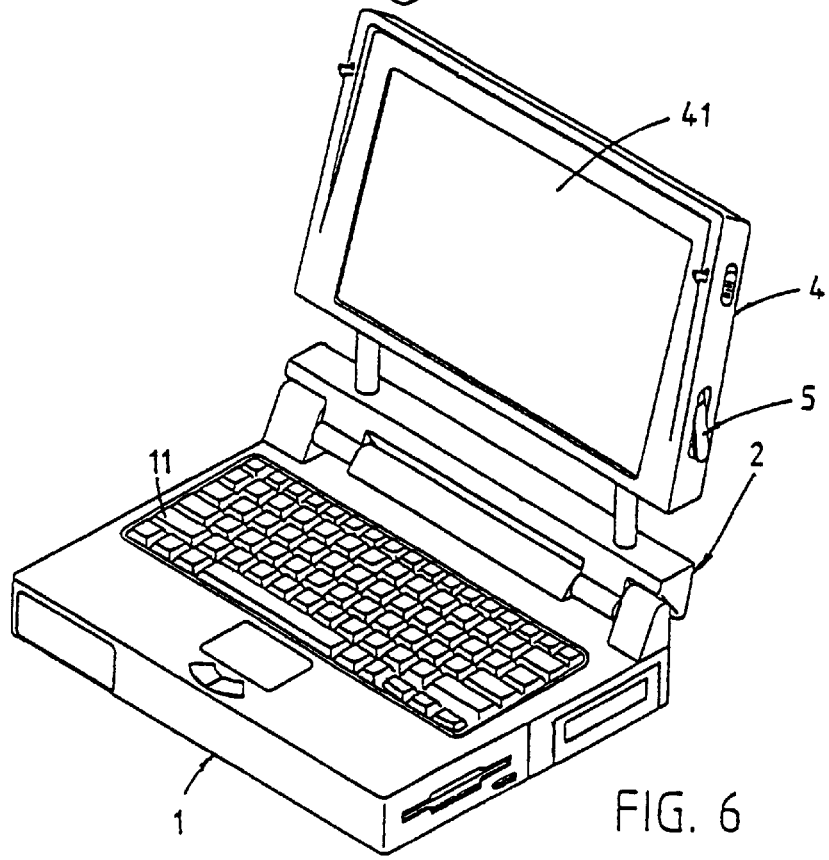
FIG. 6 is a schematic perspective view of the notebook computer of FIG. 1 except when the second case is elevated to the desired height.
Figure 2:
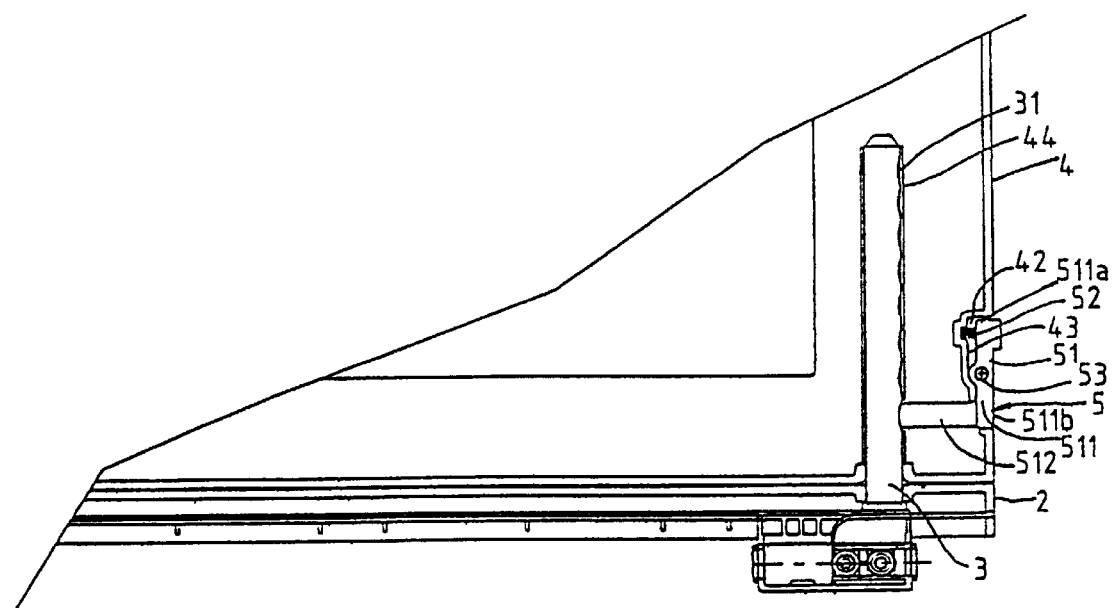
FIG. 2 is a schematic plan view of a cutaway part of the notebook computer where an actuating mechanism is provided.
Figure 7A:
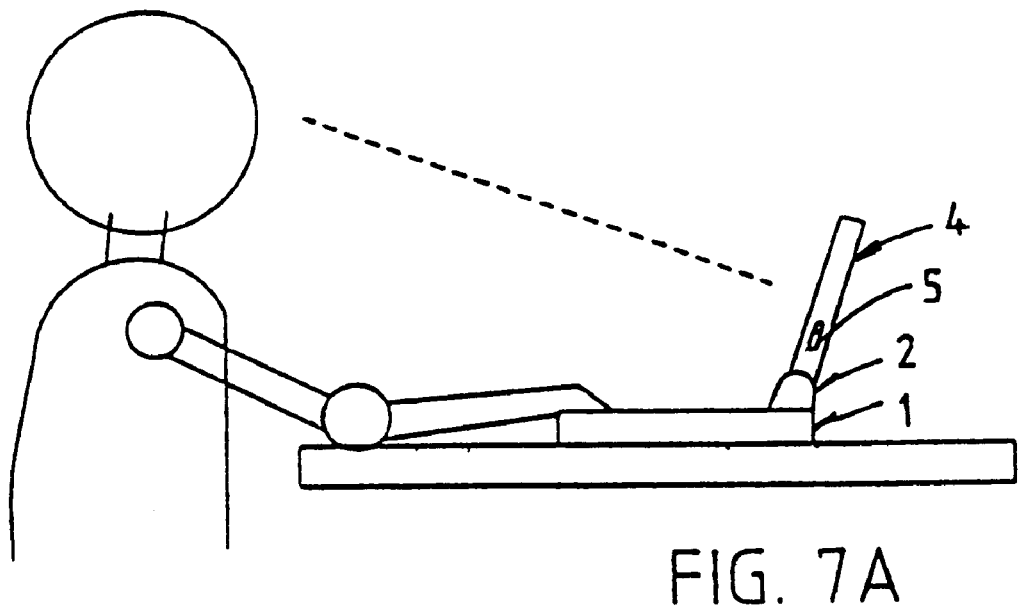
FIG. 7A is a schematic diagram which depicts a user operating a notebook computer provided with the height-adjustable case structure of the invention in which the display of the notebook computer is not elevated.

Referring to FIGS. 1, 2, and 7A, the first embodiment of the height-adjustable case structure of the invention is provided on a notebook computer, which includes a first case 1 for housing the keyboard 11 and the main circuit board (not shown) of the notebook computer; a second case 4 for housing the display 41 of the notebook computer; a hinge device 2 for linking the second case 4 to the first case 1, allowing the second case 4 to be tiltable to a desired angle for the user to view the display 41; and a hollowed guide bar 3 mounted on the hinge device 2.

Figure 3:
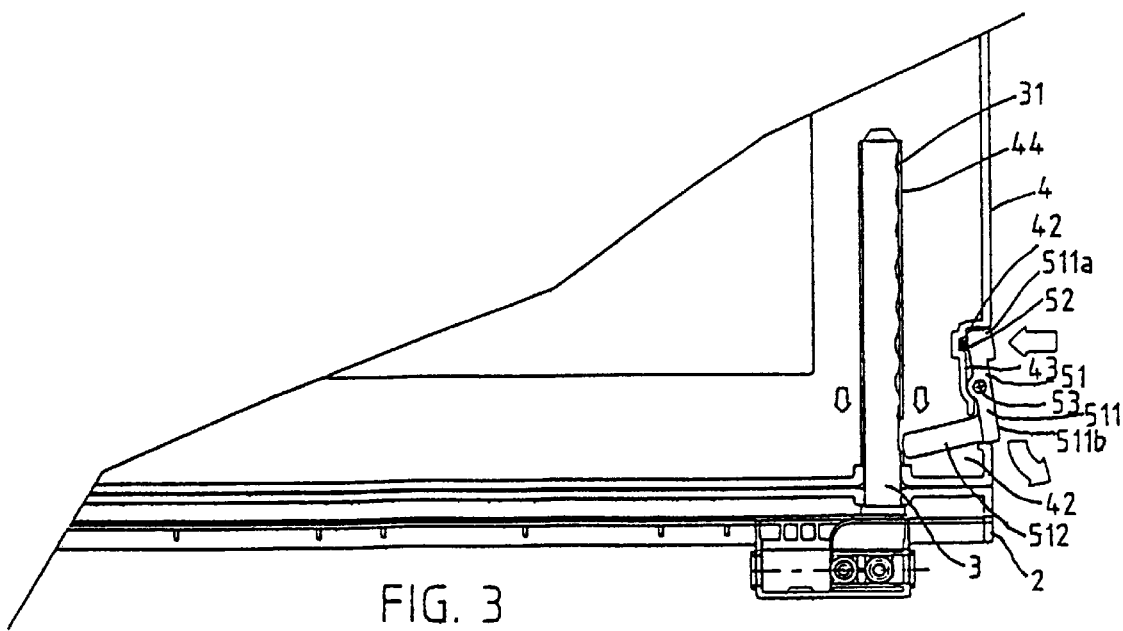
FIG. 3 shows the same of FIG. 2 except when the pressing portion of the actuating mechanism is being pressed down.
Figure 4:
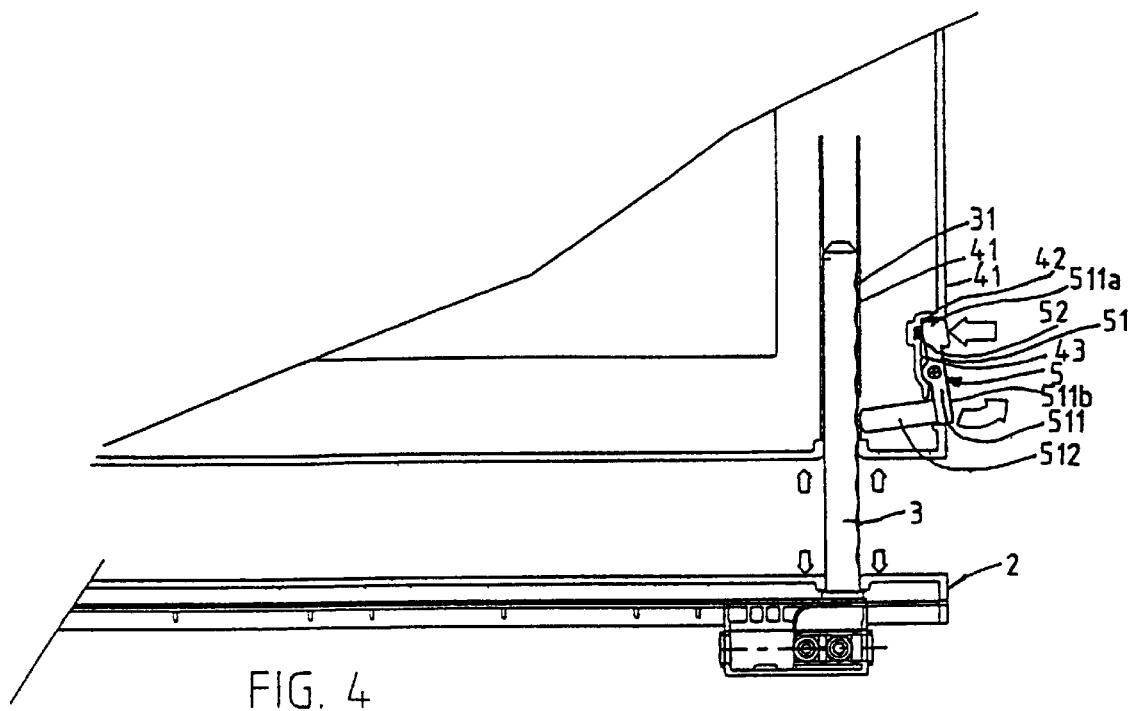
FIG. 4 shows the same of FIG. 3 except when the second case is being elevated due to the pressing portion of the actuating mechanism being pressed down.
Figure 5:
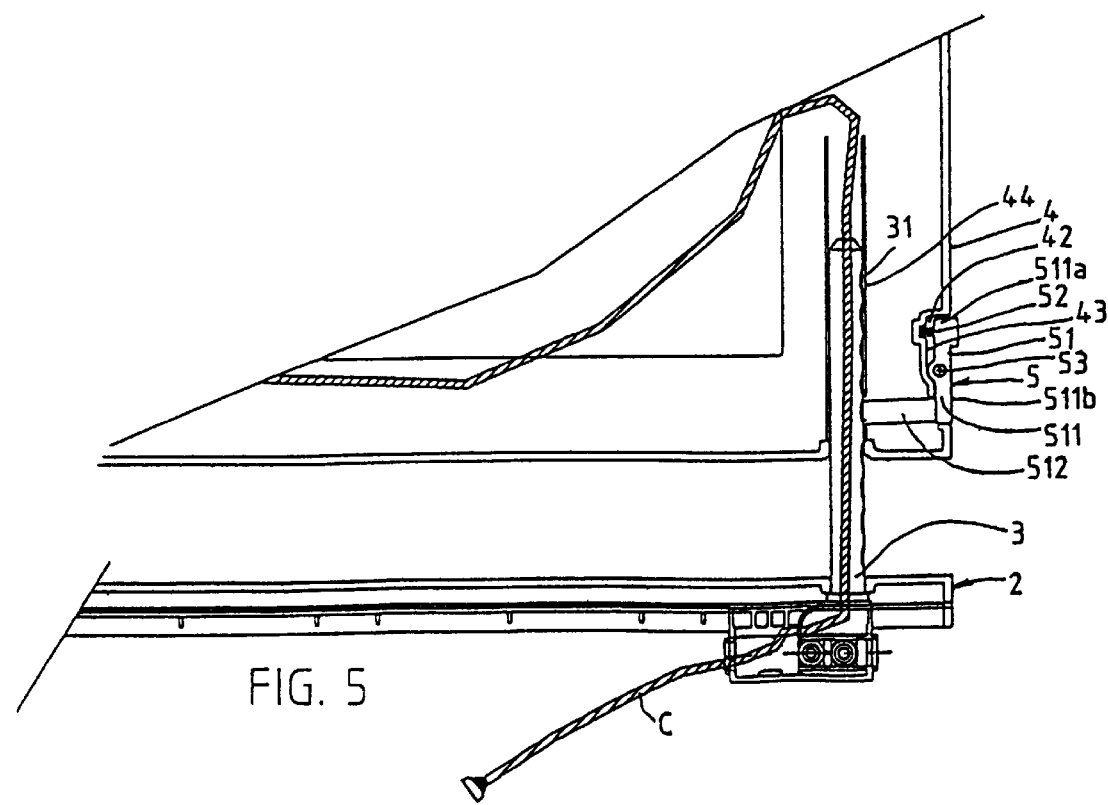
FIG. 5 shows the same of FIG. 4 except when the second case has been elevated to the desired height and the pressing portion of the actuating mechanism has been released.
Figure 7B:
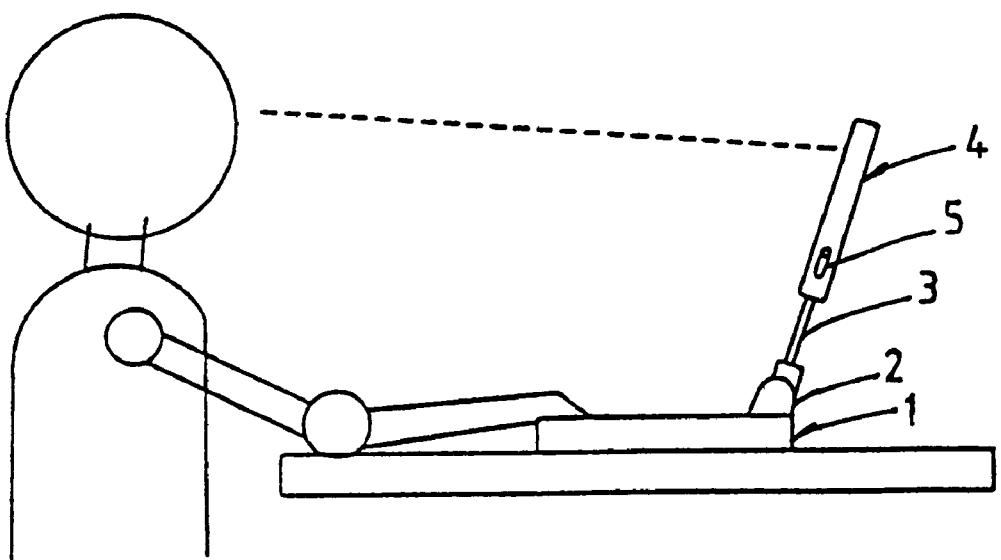
FIG. 7B shows the same of FIG. 7B except when the display is elevated to a desired height.

The second case 46 is formed with a receptacle 42 on each side thereof for accommodating an actuating mechanism 5. The guide bar 3 is inset in a guide slot 44 to allow the second case 4 to be upright supported by the guide bar 3. The actuating mechanism 5 is composed of a pivotal member 51 and an elastic member, such as a spiral spring 52, which is affixed to the upper end of the pivotal member 51. The pivotal member 51 includes a pressing portion 511 which is pivotably mounted on the wall 43 of the second case 4 by means of a shaft 53, and an actuating portion 512 which is linked to the bottom end 511b of the pressing portion 511. The spring 52 is mounted between the wall 43 of the second case 4 and the upper end 511a of the pressing portion 511 in such a manner as to urge against the upper end 511a of the pressing portion 511, thus causing the actuating portion 512 to be maintained in position in the slot 31. As a result, the second case 4 is stopped by the guide bar 3 from being movable upwards along the guide bar 3. However, when the pressing portion 511 of the pivotal member 51 is pressed down, the pivotal member 51 will be pivoted in the counterclockwise direction (with respect to the view of FIG. 3) about the shaft 53, causing the spring 52 to be compressed and the actuating portion 512 to be withdrawn from the slot 31 in the guide bar 3. As a result, the stoppage by the actuating mechanism 5 on the guide bar 3 is released, allowing the second case 4 to be movable along the guide bar 3 to a desired height (see FIG. 4 and FIG. 7B). Further, as shown in FIG. 5, when the second case 4 is moved to the desired height, the user can then release the pressing force on the pressing portion 511 of the pivotal member 51. The elasticity from the compressed spring 52 thus urges against the upper end 511a of the pressing portion 511, causing the pivotal member 51 to be pivoted in the clockwise direction, thus restoring the actuating portion 512 of the pivotal member 51 back into the slot 31 in the guide bar 3. As a result, the second case 4 is fixedly supported at the current height.

After use when the user wishes to collapse the notebook computer, the user simply needs to press down the pressing portion 511 of the pivotal member 51 and then lower the second case 4 back to the original position shown in FIG. 1. The hinge device 2 is used to hinge the second case 4 to the first case 1, allowing the second case 4 to be pivotably turnable on the first case 1. The hinge device 2 is a conventional device so description thereof will not be further detailed. Moreover, as shown in FIG. 5, a cable C is used to supply power to the display 41 in the second case 4, which is wired through the hollowed inside 32 of the guide bar 3 to a power source (not shown).

Figure 8:
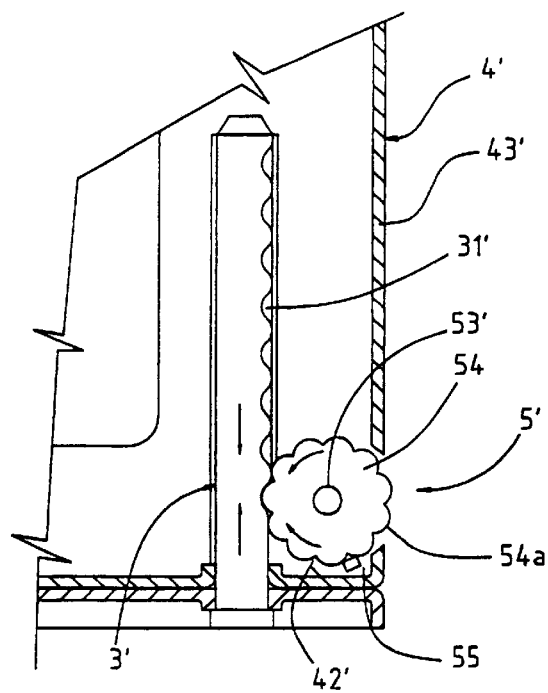
FIG. 8 is a schematic side view of a second preferred embodiment of the height-adjustable case structure, showing particularly the operation of the guide bar and the actuating mechanism thereof.

FIG. 8 is a schematic side view of a second embodiment of the height-adjustable case structure of the invention. This embodiment differs from the previous one in that the actuating mechanism, here designated instead by the reference numeral 5', is composed of a toothed knob 54 with teeth 54a on the circumference thereof, and a stopping elastic member 55 mounted on the wall 43' of the second case 4'. The stopping elastic member 55 can be used to stop the rotation of the toothed knob 54. The teeth 54a of the toothed knob 54 are meshed to the slot 31' in the guide bar 3'. The toothed knob 54 is axially coupled to a shaft 53' on the wall 43' of the second case 4', and is positioned in the receptacle 42' in the second case 4' with one part exposing to the outside of the receptacle 42' to allow the user to manually rotate the toothed knob 54. To adjust the second case 4' to the desired height, the user needs just to manually rotate the toothed knob 54 in the clockwise direction (with respect to the view of FIG. 8). This can cause the second case 4 to be moved upwards along the guide bar 3 until reaching the desired height. To lower the second case 4' back to the unelevated position, the user needs just to manually rotate the toothed knob 54 in the counterclockwise direction (with respect to the view of FIG. 8). This can cause the second case 4 to be moved downwards along the guide bar 3 back to the unelevated position.

Figure 9:
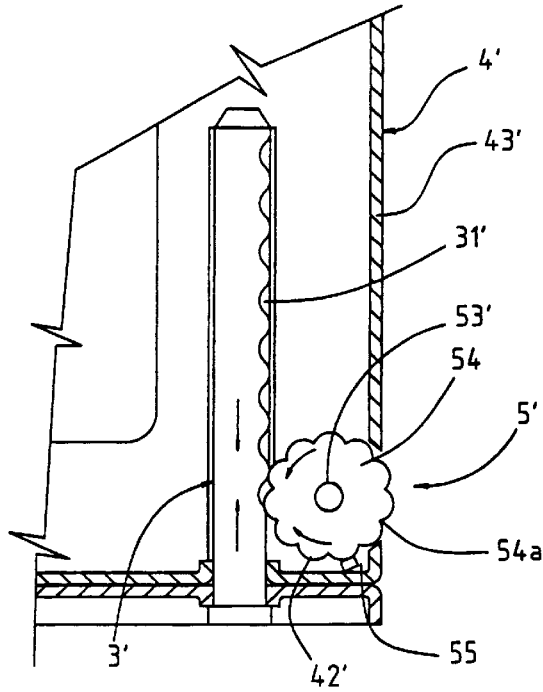
FIG. 9 shows the same of FIG. 8 except when the toothed knob is turned, which makes the stopping elastic member to withdraw from the stoppage position in the gap between one neighboring pair of the teeth on the toothed knob.

At the elevated position, the stopping elastic member 55 is set between one neighboring pair of the teeth 54a on the toothed knob 54, thus preventing the toothed knob 54 from self turning when no external force is applied thereto. Moreover, since the teeth 54a of the toothed knob 54 are inset in the slot 31' in the guide bar 3', the second case 4' can be securely supported at the elevated position without the possibility of sliding down the guide bar 3'. When the user is turning the toothed knob 54 by hand, the stopping elastic member 55 will be first pushed away by the neighboring one of the teeth 54a from its position between one pair of the teeth 54a (see FIG. 9) and then set into the next gap between the teeth 54a. The toothed knob 54 thus can be turned without being stopped by the stopping elastic member 55. The user can therefore freely turn the toothed knob 54 until the second case 4' reaches the desired position. When the user's hand is removed from the toothed knob 54, the toothed knob 54 is stopped by the stopping elastic member 55, allowing the second case 4' to be securely supported at the current position without the possibility of sliding down the guide bar 3'.

Figure 10:
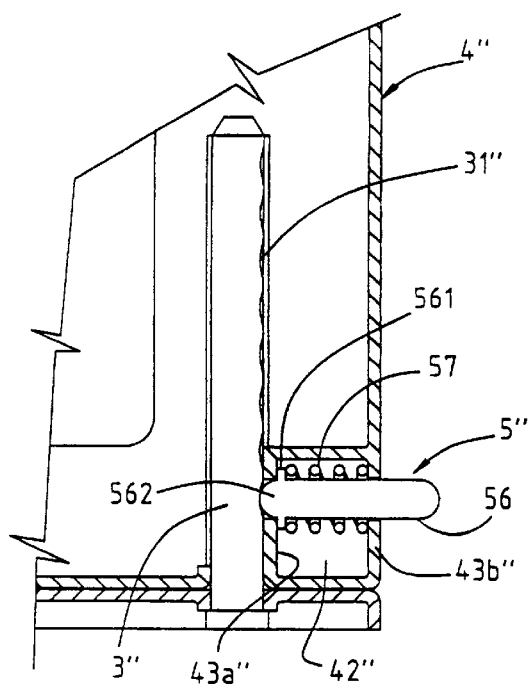
FIG. 10 is a schematic side view of a third preferred embodiment of the height-adjustable case structure, showing particularly the operation of the guide bar and the actuating mechanism thereof.
Figure 11:
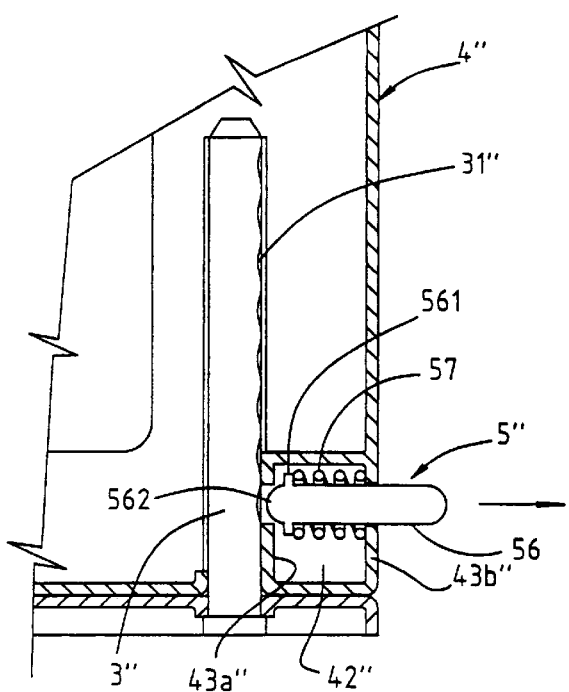
FIG. 11 shows the same of FIG. 10 except when the actuating piece is being pulled outwards to withdraw the protruded portion of the actuating piece from the slot in the guide bar.

FIG. 10 is a schematic side view of a third embodiment of the height-adjustable case structure of the invention. This embodiment differs from the previous one in that the actuating mechanism, here designated instead by the reference numeral 5", is composed of an actuating piece 56 which is positioned in the receptacle 42" in the second case 4" and perpendicularly linked to the guide bar 3", and a restoring spring 57, such as a spiral spring, which is sleeved on the actuating piece 56 and positioned between the inner wall 43a" and outer wall 43b" of the second case 4'. Further, the actuating piece 56 is formed with a stopper portion 561 on the inner end thereof, and a protruded portion 562 extending along the length of the actuating piece 56. The protruded portion 562 of the actuating piece 56 is inset in the slot 31" in the guide bar 3", allowing the second case 4" to be prevented from being movable along the guide bar 3" upwards due to the guide bar 3" being stopped by the actuating piece 56. The outer end of the actuating piece 56 is extended to the outside of the receptacle 42", allowing the user to pull the actuating piece 56 in the outward direction. When subjected to no external force, the spring 57 in the wall 43" (which has an outer end affixed to the outer wall 43b" of the second case 4" and an inner end affixed to the stopper portion 561 of the actuating piece 56) will urge against and thus maintain the protruded portion 562 of the actuating piece 56 in position in the slot 31" of the guide bar 3", preventing the second case 4" from being movable along the guide bar 3" upwards. However, as illustrated in FIG. 11, when the user grips the outer end of the actuating piece 56 and pulls the actuating piece 56 in the outward direction, the actuating piece 56 will be moved outwards, allowing the stopper portion 561 to urge against and thus compress the spring 57, and meanwhile allowing the protruded portion 562 to withdraw from the slot 31" in the guide bar 3". As a result, the second case 4" is moved upwards along the guide bar 3" to the desired height. Next, when the user releases his/her hand from the actuating piece 56, the compressed spring 57 will be released and thus urge against the stopper portion 561 of the actuating piece 56, causing the actuating piece 56 to be moved inwards until the actuating piece 56 is set into the slot 31" and the stopper portion 561 is stopped by the inner wall 43a" of the second case 4". As a result, the actuating piece 56 is restored to the position where the second case 4" is prevented from being movable along the guide bar 3".

The invention has been described using exemplary embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A height-adjustable case structure for use on a portable computer having a display, which comprises:

a first case for housing a keyboard and a main circuit board for the portable computer;

a second case for housing a display for the portable computer;

means for hinging said second case on said first case;

at least one guide bar on which said second case is slidably mounted, allowing said second case to be slidable along said guide bar to an elevated position; and an actuating mechanism mounted on said second case for securing said second case at multiple positions along said guide bar, said actuating mechanism comprises a pivotal member which is pivotally mounted on said second case by a shaft, said pivotal member comprises a pressing portion and has an upper end and a lower end, and an actuating portion which is linked to the pressing portion; and an elastic member affixed to the upper end of said pivotal member, said elastic member is mounted between an outer wall of said second case and the upper end of the pressing portion causing the actuating portion to engage said guide bar to prevent movement of said second case along said guide bar.

2. The adjustable case structure of claim 1, wherein said guide bar is formed with a series of substantially equally spaced slots.

3. The adjustable case structure of claim 2, wherein said pivotal member will be pivoted about said shaft when the pressing portion of said pivotal member is pressing down, causing said elastic member to be compressed and the actuating portion to be withdrawn from one of the slots in said guide bar, allowing said second case to be movable along said guide bar to a desired position.

4. The adjustable case structure of claim 1, wherein said elastic member is a spiral spring.

* * * * *

UNITED STATES PATENT AND TRADEMARK OFFICE
CERTIFICATE OF CORRECTION

PATENT NO : 6,016,171
DATED : January 18, 2000
INVENTOR(S) : Lu-Long Tsao

It is certified that error appears in the above-identified patent and that said Letters Patent is hereby corrected as shown below:

On the title page, item 75 Inventor
replace "Lu-Lung Tsao"
with --Lu-Long Tsao--.

Signed and Sealed this

Thirteenth Day of February, 2001

*Attest:*

NICHOLAS P. GODICI

*Attesting Officer*   Acting Director of the United States Patent and Trademark Office